United States Patent
Picozzi et al.

(10) Patent No.: US 7,132,574 B2
(45) Date of Patent: Nov. 7, 2006

(54) PREPARATION OF PERFLUOROPOLYETHERS HAVING AT LEAST ONE —$CH_2OH$ OR —$CH(CF_3)OH$ END GROUP

(75) Inventors: Rosaldo Picozzi, Milan (IT); Claudio Tonelli, Milan (IT)

(73) Assignee: Solvay Solexis S.p.A., Milan (IT)

( * ) Notice: Subject to any disclaimer, the term of this patent is extended or adjusted under 35 U.S.C. 154(b) by 266 days.

(21) Appl. No.: 10/840,404

(22) Filed: May 7, 2004

(65) Prior Publication Data

US 2004/0230080 A1 Nov. 18, 2004

(30) Foreign Application Priority Data

May 15, 2003 (IT) .......................... MI2003A0971

(51) Int. Cl.
*C07C 41/18* (2006.01)
(52) U.S. Cl. ....................................... 568/615; 568/623
(58) Field of Classification Search ................ 568/615, 568/623
See application file for complete search history.

(56) References Cited

U.S. PATENT DOCUMENTS

| | | | |
|---|---|---|---|
| 3,766,251 A | 10/1973 | Caporiccio et al. | 260/486 H |
| 3,810,874 A | 5/1974 | Mitsch et al. | 260/75 H |
| 3,847,978 A | 11/1974 | Sianesi et al. | 260/535 H |
| 4,396,784 A | 8/1983 | Johnson et al. | 568/842 |
| 6,060,626 A * | 5/2000 | Fujii et al. | 568/463 |
| 6,479,712 B1 * | 11/2002 | Kawa | 568/842 |
| 2003/0050516 A1 | 3/2003 | Fischer et al. | 568/821 |

FOREIGN PATENT DOCUMENTS

| | | |
|---|---|---|
| EP | 0553815 | 8/1993 |
| EP | 1114842 | 7/2001 |
| EP | 1388556 | 2/2004 |
| GB | 1309401 | 3/1973 |
| WO | WO 98/33589 | 8/1998 |
| WO | WO 01/70657 | 9/2001 |

* cited by examiner

*Primary Examiner*—Rosalynd Keys

(57) ABSTRACT

A process for preparing perfluoropolyethers having at least one —$CH_2OH$ or —$CH(CF_3)OH$ end group by reaction of the corresponding pefluoropolyethers having at least one carboxylic —COOH or ketonic —$(CF_3)C=O$ end group with gaseous hydrogen, between 80° C. and 140° C., in the presence of hydrogenation catalysts.

10 Claims, No Drawings

PREPARATION OF PERFLUOROPOLYETHERS HAVING AT LEAST ONE —CH$_2$OH OR —CH(CF$_3$)OH END GROUP

The present invention relates to a process for preparing perfluoropolyethers (PFPE) having at least one —CH$_2$OH or —CH(CF$_3$)OH end group by catalytic reduction of the corresponding perfluoropolyethers having at least one carboxylic —COOH or ketonic —(CF$_3$)C=O end group.

The perfluoropolyethers having at least one —CH$_2$OH end group are known from U.S. Pat. No. 3,766,251 and U.S. Pat. No. 3,810,874. They are prepared by chemical reduction with metal hydrides from the corresponding perfluoropolyethers having at least one carboxylic or ester group, in particular starting from PFPE containing —COOR groups wherein R is a C$_1$–C$_5$ linear or branched alkyl chain. This process is described for example in the patents GB 1,309,401, U.S. Pat. No. 3,847,978. In said processes, the reduction is carried out by using an organic reducing agent in the presence of solvents. As reducing agents it is mentioned lithium-aluminum hydride (LiAlH$_4$) dissolved in inert solvents as tetrahydrofuran (THF), diglyme or dioxane, or sodium-borohydride (NaBH$_4$) dissolved in inert solvents or preferably dissolved in protic solvents such as methanol, ethanol.

By using as reducing agent sodium-borohydride, the reduction stoichiometry would involve the use of one NaBH$_4$ mole for 2 equivalents of ester to be reduced. However, from patent application EP 1,114,842 A2 in the name of the Applicant, it has been found that in said reduction reaction there is a significant development of molecular hydrogen, 1.5–2.0 moles of H$_2$ for ester equivalent. This shows a decomposition of the sodium-borohydride or of intermediate hydride species, what makes it necessary to use a large excess of reducing agent, even higher than 60% of the stoichiometric value, to obtain a substantial ester conversion, higher than 99%.

It follows therefore that said reduction shows remarkable economic and processing drawbacks: economic since the reducing agent NaBH$_4$ is an expensive compound and it is necessary to use it in a large excess; processing, since its management becomes critical due to the presence of the developed hydrogen, is flammable and explosive, and requires to be diluted with remarkable amounts of an inert gas to bring it to safety values (flammability and explosiveness limit<4% by volume). To limit the hydrogen development the Applicant has found advantageous the use of a basic stabilizer of organic type, as for example sodium ethylate, as described in the aforesaid patent application. In this way the NaBH$_4$ excess with respect to the stoichiometry, needed to have a 99% conversion, decreases from 60% to 5–15%.

However with said stabilizer a partial hydrolysis of the ester takes place, promoted by the basic organic stabilizer and by the water naturally present in the solvent, to give the corresponding salt no longer reducible to alcohol under the processing conditions. To convert said salt to alcohol it is necessary therefore to acidify the reaction raw product, its esterification and its treatment it with a further aliquot of reducing agent, with a consequent increase of procedures and of production costs.

The need was threfore felt to find a process having a high yield and selectivity allowing to obtain by reduction of perfluoropolyether carboxylic acids or ketones the corresponding alcohols without having the drawbacks met with the use of inorganic hydrides as reducing agents dissolved in a solvent medium.

It has been surprisingly and unexpectedly found that it is possible to reduce with hydrogen and catalysts the carboxylic acids or the ketones having a perfluoropolyether chain to the corresponding alcohols with conversions higher than 99% and selectivity higher than 98% so overcoming the inconveniences that the prior art shows.

It is an object of the present invention, therefore, a process for preparing perfluoropolyethers having at least one —CH$_2$OH or —CH(CF$_3$)OH end group comprising reacting the corresponding pefluoropolyethers having at least one carboxylic —COOH or ketonic —(CF$_3$)C=O end group with gaseous hydrogen, in the presence of hydrogenation catalysts selected between Ru or Rh supported on carbon, preferably Ru supported on carbon, operating in a liquid phase formed of the same carboxylic or ketonic perfluoropolyethers, at temperatures in the range 80° C.–140° C., preferably 120° C.–130° C.

Generally one operates at a pressure in the range 10–100 atm, preferably 30–50 atm.

The preferred carboxylic or ketonic perfluoropolyethers used as starting compounds are those having the formula

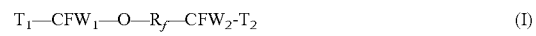  (I)

wherein:

$T_1$, $T_2$, equal to or different from each other, are selected from end groups of the —COOH, —COCF$_3$ type, or —F, —CF$_3$, —CF$_2$CF$_3$ with the proviso that at least one between $T_1$ and $T_2$ is —COOH, —(CF$_3$)C=O, $W_1$ and $W_2$, equal to or different from each other, are F, CF$_3$;

$R_f$ is a perfluoropolyoxyalkylene chain having a number average molecular weight 500–10,000 comprising one or more units of —CF$_2$CF$_2$O—, —CF$_2$O—, —C$_3$F$_6$O—, —CF$_2$(CF$_2$)$_z$CF$_2$O—type wherein z is an integer equal to 1 or 2, —CR$_4$R$_5$CF$_2$CF$_2$O—, —(CFYO)— wherein Y is equal to F or CF$_3$;

$R_4$ and $R_5$, equal to or different from each other, are selected from H, Cl, linear or branched perfluoroakyl having a number of C atoms from 1 to 4;

said units being statistically distributed along the perfluoropolyoxyalkylene chain.

In formula (I) $R_f$ preferably comprises the following repeating units statistically distributed along the chain:
—(CF$_2$CF$_2$O)—, —(CFYO)—
—(C$_3$F$_6$O)—,
—(CF$_2$(CF$_2$)$_z$O)— wherein z is an integer equal to 2 or 3,
—CR$_4$R$_5$CF$_2$CF$_2$O— wherein R$_4$ and R$_5$, equal to or different from each other, are selected from H, Cl or perfluoroalkyl having 1–4 C atoms.

In particular the following fluoropolyether $R_f$ can be mentioned as preferred:

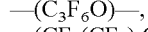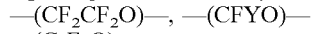  (A)

wherein Y is F or CF$_3$; a and b are integers such that the molecular weight is in the above range; a/b is between 10 and 100;

or the repeating units indicated in (A) can be linked as follows:

wherein R'$_f$ is a fluoroalkylene group from 1 to 4 C atoms;

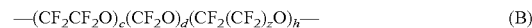  (B)

wherein c, d and h are integers such that the molecular weight is within the above range; c/d is between 0.1 and 10; h/(c+d) is between 0 and 0.05, z has the above value, h can also be equal to 0;

$$-(CF_2CF(CF_3)O)_e(CF_2CF_2O)_f(CFYO)_g- \quad (C)$$

wherein Y is F or $CF_3$; e, f, g are integers such that the molecular weight is within the above range; e/(f+g) is between 0.1 and 10, f/g is between 2 and 10;

$$-(CF_2(CF_2)_zO)_s- \quad (D)$$

wherein s is an integer such as to give the above molecular weight, z has the already defined meaning;

$$-(CR_4R_5CF_2CF_2O)_{j'}- \quad (E)$$

wherein $R_4$ and $R_5$ are equal to or different from each other and selected among H, Cl or perfluoroalkyl, for example having 1–4 C atoms, j' being an integer such that the molecular weight is that above mentioned; said units inside the fluoropolyoxyalkylene chain can be linked with each other as follows:

$$-(CR_4R_5CF_2CF_2O)_{p'}-R'_f-O-(CR_4R_5CF_2CF_2O)_{q'}-$$

wherein $R'_f$ is a fluoroalkylene group, for example from 1 to 4 C atoms, p' and q' are integers such that the molecular weight is that above indicated;

$$-(CF(CF_3)CF_2O)_{j''}-(R'_f)-O-(CF(CF_3)CF_2O)_{j''} \quad (F)$$

j" being an integer such as to give the above molecular weight, $R'_f$ is fluoroalkylene group from 1 to 4 C atoms.

Particularly Preferred Structures are (A) and (B).

The perfluoropolyethers having at least one carboxylic or ketonic end group are known in the prior art. In particular those carboxylic are obtained, for example, by hydrolysis of the corresponding acyl fluorides.

The process object of the present invention does not require the use of organic solvents or water with evident advantages due to the absence of wastes to be treated and is carried out under mild conditions (T≦140° C.) and with extremely rapid kinetics.

The reduction compound is isolated by mere filtration from the reaction slurry containing dispersed the supported catalyst.

The most preferred hydrogenation catalyst is formed of Ru supported on carbon containing from 1 to 10% by weight of Ru, preferably from 3 to 5% with respect to the total weight of the catalyst. Said catalyst allows to obtain conversions higher than 99% and selectivity higher than 98%.

The used catalyst amount ranges from 1 to 20% by weight with respect to the carboxylic or ketonic perfluoropolyether to be reduced, preferably from 3 to 10%.

The reaction is carried out in a reactor resistant to fluorinated acids and equipped with mechanical stirring. The stirring allows to maintain the catalyst suspended in the reaction mass.

The hydrogen can be fed in a continuous or discontinuous way.

For example, the reaction is complete in 3–7 hours using 2–4% by weight, with respect to the reactant, of Ru/C at 5% by weight of Ru by operating at temperatures between 120° and 130° C. and at 50 atm.

The compound is isolated, by bringing again the internal reactor pressure to 1 atm and by filtering it from the catalyst, it can be reused for successive tests.

Alternatively, one can use a filter inside the reactor and use the working pressure to filter the reaction mass. The catalyst thus remains in the reactor and is ready to be used for successive reduction tests.

The hydrogenation catalyst can be used for at least 8 reaction tests without having significant decreases of conversion and selectivity in the desired compound.

The catalyst, partially exhausted after a very high number of tests, can furthermore be regenerated according to the following method: the exhausted catalyst is suspended in the starting perfluoropolyether acid of formula (I), at a catalyst concentration in the acid comprised between 3 and 10% by weight, preferably between 4 and 6%. The temperature is brought to a value in the range 100°–130° C., air is bubbled for about 3–5 hours. Subsequently hydrogen is flowed until decoloration of the liquid phase. The obtained catalyst slurry can directly be used for obtaining perfluoropolyethers (PFPE) having at least one $-CH_2OH$ or $-CH(CF_3)OH$ end group according to the process described in the present invention.

The compound obtained by the present process are used, for example, as lubricants for magnetic discs or as macromers for the preparation of polycondensation polymers, e.g., polyurethanes, polyesters, polycarbonates and epoxy resins.

In the reduction of pefluoropolyethers having at least one carboxylic or ketonic end group it is essential to have available the process of the present invention having a very high conversion and selectivity allowing to obtain compounds having a high purity. In fact the macromeric and polydispersed nature of the perfluoropolyether derivatives of the present invention, combined with their characteristics of amorphous and hardly distillable liquids, make impossible or anyway economically not advantageous successive purification steps to eliminate from the reaction mixture the unconverted species or the reaction by-products.

Furthermore in the case of the preparation of perfluoropolyethers having two alcohol end groups, a low conversion and selctivity leads to the obtainment also of macromolecules having the two end groups different the one from the other, the separation of which from the desired compound would result further difficult.

The process of the present invention can be carried out in a continuous, semicontinuous or in a discontinuous way.

Some illustrative Examples follow which are not limitative of the present invention.

EXAMPLES

Example 1

281 g of bicarboxylic perfluoropolyether of formula $$HOOCCF_2O(CF_2CF_2O)_p(CF_2O)_qCF_2COOH$$

and number average molecular weight 2020 and 14 g of catalyst (5% Ru/C) are introduced in a 0.5 l Hastelloy C autoclave. It is pressurized with $H_2$ at 50 atm and heated progressively up to 130° C. After 3 h and 40 minutes a sampling is carried out, by the sample analysis a conversion of 99.7% and a selectivity of 98.6% are shown. After 5 h the conversion is equal to 100% and the selectivity 98.6%.

The $^{19}F$-NMR analysis confirms that the obtained reaction compound having a selectivity of 98.6% is the perfluoropolyether diol of formula:

$$HOCH_2CF_2O(CF_2CF_2O)_p(CF_2O)_qCF_2CH_2OH$$

Furthermore it is shown the presence of $-OCF_2CH_3$ end groups in an amount of 0.7% originated from a secondary hydrogenolysis reaction.

265 g of reaction compound are recovered, after having cooled the autoclave to room temperature, using the same hydrogen overpressure and the filter inside the autoclave itself.

Example 2

318 g of perfluoro bicarboxylic acid of formula

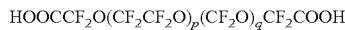
$$HOOCCF_2O(CF_2CF_2O)_p(CF_2O)_qCF_2COOH$$

having number average molecular weight 154.0 and 16 g of Ru/C (5% of Ru), equal to 5.1% of catalyst with respect to the acid, are introduced in the same autoclave of the Example 1, suitably washed and free from residue of previous processings. It is pressurized with $H_2$ at 50 atm and progressively heated up to 130° C. After 3 h a sampling is carried out, by the analysis of the sampled product a conversion of 98.9% and a selectivity of 98.8% are shown.

After 4 h and 20 minutes the conversion results equal to 100% and the selectivity 98.8%.

The $^{19}$F-NMR analysis confirms that the obtained reaction compound having a selectivity of 98.8% is the perfluoropolyether diol of formula:

$$HOCH_2CF_2O(CF_2CF_2O)_p(CF_2O)_qCF_2CH_2OH$$

Furthermore it is shown the presence of —$OCF_2CH_3$ end groups in an amount equal to 0.6% originated from a secondary hydrogenolysis reaction.

305 g of reaction compound are recovered, after having cooled the autoclave to room temperature, using the same hydrogen overpressure and the filter inside the autoclave itself.

Example 3

200 g of perfluoro bicarboxylic acid of formula

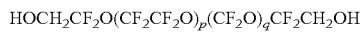
$$HOOCCF_2O(CF_2CF_2O)_p(CF_2O)_qCF_2COOH$$

having number average molecular weight 2020 and 11 g of Ru/C (5% of Ru), equal to 5.1% of catalyst with respect to the acid, are introduced in the same autoclave of the Example 1, suitably washed and free from residue of previous processings.

It is pressurized with $H_2$ at 50 atm and progressively heated up to 100° C. After 14 h a sampling is carried out, by the analysis of the sampled product a conversion equal to 100% and a selectivity of 99% are shown.

The $^{19}$F-NMR analysis confirms that the obtained reaction compound having a selectivity of 99% is the perfluoropolyether diol of formula:

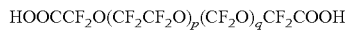
$$HOCH_2CF_2O(CF_2CF_2O)_p(CF_2O)_qCF_2CH_2OH$$

Furthermore it is shown the presence of —$OCF_2CH_3$ end groups in an amount equal to 0.5% originated from a secondary hydrogenolysis reaction.

192 g of reaction product are recovered, after having cooled the autoclave to room temperature, using the same hydrogen overpressure and the filter inside the autoclave itself.

Example 4

537 g of perfluoro bicarboxylic acid of formula

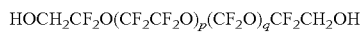
$$HOOCCF_2O(CF_2CF_2O)_p(CF_2O)_qCF_2COOH$$

and number average MW 1540 (PE 790) and 27 g of Ru/C (5% of Ru), equal to 5% of catalyst with respect to the acid, are introduced in the same autoclave of the Example 1, suitably washed and free from residue of previous processings. It is pressurized with $H_2$ at 50 atm and progressively heated up to 130° C. After 7 h a sampling is carried out, by the analysis of the sampled product a conversion equal to 100% and a selectivity of 98.8% are shown.

The $^{19}$F-NMR analysis confirms that the obtained reaction compound having a selectivity of 98.8% is the perfluoropolyether diol of formula:

$$HOCH_2CF_2O(CF_2CF_2O)_p(CF_2O)_qCF_2CH_2OH$$

Furthermore it is shown the presence of —$OCF_2CH_3$ end groups in an amount equal to 0.6% originated from a secondary hydrogenolysis reaction.

515 g of reaction compound are recovered, after having cooled the autoclave to room temperature, using the same hydrogen overpressure and the filter inside the autoclave itself.

In the same autoclave 7 additional reduction tests are carried out under the same conditions of the intitial test, feeding the same perfluorobicarboxylic acid.

The analysis of the reduction compounds indicates that all the tests show a conversion of 100% and a selectivity in the expected alcohol derivative of 98.8%.

Example 5

280 g of bicarboxylic perfluoropolyether acid of formula

$$HOOCCF_2O(CF_2CF_2O)_p(CF_2O)_qCF_2COOH$$

and number average molecular weight 2020 and 14 g of catalyst (5% Ru/C) are introduced in the 0.5 l Hastelloy C autoclave. It is pressurized with $H_2$ at 50 atm and progressively heated up to 130° C. After 3 h and 40 minutes a sampling is carried out, by the sample analysis a conversion of 99.7% and a selectivity equal to 98.2% are shown. After 5 h the conversion is equal to 100% and the selectivity equal to 98.2%.

The $^{19}$F-NMR analysis confirms that the obtained reaction compound having a selectivity of 98.2% is the perfluoropolyether diol of formula:

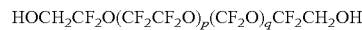
$$HOCH_2CF_2O(CF_2CF_2O)_p(CF_2O)_qCF_2CH_2OH$$

Furthermore it is shown the presence of —$OCF_2CH_3$ end groups in amounts equal to 0.9% originated from a secondary hydrogenolysis reaction.

262 g of reaction compound are recovered, after having cooled the autoclave to room temperature, using the same hydrogen overpressure and the filter inside the autoclave itself.

Example 6 (Comparative)

537 g of perfluoro bicarboxylic acid of formula

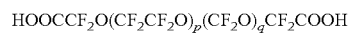
$$HOOCCF_2O(CF_2CF_2O)_p(CF_2O)_qCF_2COOH$$

having number average molecular weight 1540 and 27 g of Ru/C (5% of Ru), equal to 5% of catalyst with respect to the acid, are introduced in the same autoclave of the Example 1. It is pressurized with $H_2$ at 50 atm, then heated up to 175° C. for 7 h. A sampling is carried out, by the analysis of the sampled compound a conversion equal to 100% and a selectivity of 89.8% are shown.

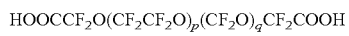

The $^{19}$F-NMR analysis confirms that the obtained reaction compound having a selectivity of 89.8% is the perfluoropolyether dial of formula:

$$HOCH_2CF_2O(CF_2CF_2O)_p(CF_2O)_qCF_2CH_2OH$$

Furthermore it is shown the presence of —OCF$_2$CH$_3$ end groups in amounts equal to 2% originated from a secondary hydrogenolysis reaction and of —CF$_2$H end groups in an amount equal to 3.1% deriving from the decomposition of the acid (or its salts), corresponding to 10.2% of a perfluoropolyether of formula $$HOCH_2CF_2O(CF_2CF_2O)_p(CF_2O)_qCF_2-X$$

(wherein X=H, CH$_3$)

Example 7 (Comparative)

In the same autoclave of the previous Examples, 330 g of perfluoro bicarboxylic acid of formula $$HOOCCF_2O(CF_2CF_2O)_p(CF_2O)_qCF_2COOH$$

having number average molecular weight 1540, 17 g of Ru/C (5% of Ru), equal to 5% of catalyst with respect to the acid, are introduced and 160 g of water are added. It is pressurized with H$_2$ at 50 atm and progressively heated up to 140° C.

After 4 h a sampling is carried out, by the analysis of the sampled compound a conversion equal to 99.3% and a selectivity of 89.4% are shown.

The $^{19}$F-NMR analysis confirms that the obtained reaction compound having a selectivity of 89.4% is the perfluoropolyether diol of formula:

$$HOCH_2CF_2O(CF_2CF_2O)_p(CF_2O)_qCF_2CH_2OH$$

Furthermore it is shown the presence of —OCF$_2$CH$_3$ end groups in an amount equal to 2% originated from a secondary hydrogenolysis reaction and of —CF$_2$H end groups in an amount equal to 3.3% deriving from the decomposition of the acid (or its salts).

The obtained mixture contains 89.4% by moles of the desired compound and 10.6% by moles of a perfluoropolyether of formula $$HOCH_2CF_2O(CF_2CF_2O)_p(CF_2O)_qCF_2-X$$

(wherein X=H, CH$_3$)

Example 8 (Comparative)

In the same autoclave of the Example 1, 330 g of perfluoro bicarboxylic acid of formula $$HOOCCF_2O(CF_2CF_2O)_p(CF_2O)_qCF_2COOH$$

having number average molecular weight 1540, 17 g of Ru/C (5% of Ru), equal to 5% of catalyst with respect to the acid, are introduced and 160 g of water are added. It is pressurized with H$_2$ at 50 atm and progressively heated up to 175° C. After 4 h a sampling is carried out, by the analysis of the sampled compound a conversion equal to 99.0% and a selectivity of 79.8% are shown.

The $^{19}$F-NMR analysis confirms that the obtained reaction compound having a selectivity of 79.8% is the perfluoropolyether diol of formula:

$$HOCH_2CF_2O(CF_2CF_2O)_p(CF_2O)_qCF_2CH_2OH$$

Furthermore it is shown the presence of —OCF$_2$CH$_3$ end groups originated from a secondary hydrogenolysis reaction in an amount equal to 1.7% and of —CF$_2$H end groups deriving from the decomposition of the acid (or its salts) equal to 8.4%, corresponding to a molar composition of the mixture of 79.8% of the desired compound and of about 20.2% of a perfluoropolyether of formula $$HOCH_2CF_2O(CF_2CF_2O)_p(CF_2O)_qCF_2-X$$

(wherein X=H, CH$_3$)

Example 9 (Comparative)

The test described in the Example 4 is repeated using the same operating conditions and the same acid precursor, substituting the Ru/C catalyst with a similar amount of Ru/CaF$_2$ (containing 5% Ru with respect to the support). After 7 h at 130° C., the analysis of the reaction mixture shows the presence of the only starting acid, therefore the conversion is zero.

Example 10 (Comparative)

The test described in the Example 1 is repeated using the same operating conditions and the same acid precursor, substituting the Ru/C catalyst with a similar amount of Pt/C. After 5 h at 130° C., the analysis of the reaction mixture shows the presence of the only starting acid, therefore the conversion is zero.

Example 11 (Comparative)

The test described in the Example 1 is repeated using the same operating conditions and the same acid precursor, substituting the Ru/C catalyst with 2CuO.Cr$_2$O$_3$/C at a temperature of 140° C.

After 4 h at 140° C. and 50 atm, the analysis of the reaction mixture shows the absence of the reduction compound and the presence of perfluoropolyethers with —CF$_2$H end groups (10% molar) derived from the decomposition of the acid or of its salts.

The invention claimed is:

1. A process for preparing perfluoropolyethers having at least one —CH$_2$OH or —CH(CF$_3$)OH end group comprising: reacting the corresponding perfluoropolyethers having at least one carboxylic —COOH or ketonic —(CF$_3$) C═O end group with gaseous hydrogen, in the presence of hydrogenation catalysts selected between Ru or Rh supported on carbon, at temperatures in the range 80° C.–140° C.

2. A process according to claim 1, wherein the starting perfluoropolyethers having at least one carboxylic or ketonic end group have formula $$T_1-CFW_1-O-R_f-CFW_2-T_2 \qquad (I)$$

wherein:
- $T_1$, $T_2$, equal to or different from each other, are selected from end groups of the type —COOH, —COCF$_3$, or —F, —CF$_3$, —CF$_2$CF$_3$ with the proviso that at least one between $T_1$ and $T_2$ is —COOH, —(CF$_3$)C═O,
- —W$_1$ and W$_2$, equal to or different from each other, are F, CF$_3$;
- —R'$_f$ is a perfluropolyoxyalkylene chain having a number average molecular weight 500–10,000 comprising one or more units of —CF$_2$CF$_2$O—, —CF$_2$O—, —C$_3$F$_6$O, —CF$_2$(CF$_2$)$_z$CF$_2$O— wherein z is an integer equal to 1 or 2, —CR$_4$R$_5$ CF$_2$CF$_2$O—, —(CFYO)— wherein Y is equal to F or CF$_3$;
- —R$_4$ and R$_5$, equal to or different from each other, are selected from H, Cl, linear or branched perfluoroakyl having a number of C atoms from 1 to 4; said units being statistically distributed along the perfluoropolyoxyalkylene chain.

3. A process according to claim 2, wherein the $R_f$ perfluoropolyether chain is selected from:

$$-(CF_2CF(CF_3)O)_a(CFYO)_b-\qquad (A)$$

wherein Y is F or $CF_3$; a and b are integers such that the molecular weight is in the above range; a/b is between 10 and 100;

or the repeating units indicated in (A) can be linked as follows:

$$-(CF_2CF(CF_3)O)_a(CFYO)_b-CF_2(R'_f)CF_2-O-(CF_2CF(CF_3)O)_a(CFYO)_b-$$

wherein $R'_f$ is a fluoroalkylene group from 1 to 4 C atoms;

$$-(CF_2CF_2O)_c(CF_2O)_d(CF_2(CF_2)_zO)_h-\qquad (B)$$

wherein c, d and h are integers such that the molecular weight is within the above range; c/d is between 0.1 and 10; h/(c+d) is between 0 and 0.05, z has the above value, h can also be equal to 0;

$$-(CF_2CF(CF_3)O)_e(CF_2CF_2O)_f(CFYO)_g-\qquad (C)$$

wherein Y is F or $CF_3$; e, f, g are integers such that the molecular weight is within the above range; e/(f+g) is between 0.1 and 10, f/g is between 2 and 10;

$$-(CF_2(CF_2)_zO)_s-\qquad (D)$$

wherein s is an integer such as to give the above molecular weight, z has the already defined meaning;

$$-(CR_4R_5CF_2CF_2O)_{j'}-\qquad (E)$$

wherein $R_4$ and $R_5$ are equal to or different from each other and selected among H, Cl or perfluoroalkyl having 1–4 C atoms, j' being an integer such that the molecular weight is that mentioned above, said units inside the fluoropolyoxyalkylene chain can be linked with each other as follows:

$$-(CR_4R_5CF_2CF_2O)_{p'}-R'_R-O-(CR_4R_5CF_2CF_2O)_{q'}-$$

wherein $R'_f$ is a fluoroalkylene group, from 1 to 4 C atoms; p' and q' are integers such that the molecular weight is that above indicated; and $$-(CF(CF_3)CF_2O)_{j''}-(R'_f)-O-(CF(CF_3)CF_2O)_{j''}\qquad (F)$$

j" being an integer such as to give the above molecular weight, $R'_f$ is a fluoroalkylene group from 1 to 4 C atoms.

4. A process according to claim 3, wherein the perfluoropolyether $R_f$ chain is the structure (A) or (B).

5. A process according to any one of claims 1–4 wherein the hydrogenation catalyst is formed of Ru supported on carbon containing from 1 to 10% by weight of Ru with respect to the total weight of the catalyst.

6. A process according to any one of claims 1–4 wherein the used catalyst amount ranges from 1 to 20% by weight, with respect to the perfluoropolyether having at least one carboxylic or ketonic end group.

7. A process according to any one of claims 1–4 wherein the process is carried out in a discontinuous, semicontinuous or in a continuous way.

8. A process according to claim 1 wherein the reacting step is conducted at temperatures in the range of 120–130° C.

9. A process according to claim 5 wherein the hydrogenation catalyst contains from 3 to 5% by weight of Ru.

10. A process according to claim 6 wherein the used catalyst amount ranges from 3 to 10% by weight.

* * * * *

UNITED STATES PATENT AND TRADEMARK OFFICE
CERTIFICATE OF CORRECTION

PATENT NO.        : 7,132,574 B2
APPLICATION NO. : 10/840404
DATED               : November 7, 2006
INVENTOR(S)      : Rosaldo Picozzi et al.

It is certified that error appears in the above-identified patent and that said Letters Patent is hereby corrected as shown below:

COLUMN 1:

Line 36, "what" should read --which--; and
Line 65, "threfore" should read --therefore--.

COLUMN 3:

Line 27, "—$(CF(CF_3)CF_2O)_{j''}$—$_{(R'f)}$—O—$(CF(CF_3)CF_2O)_{j''}$   (F)" should read
-- —$(CF(CF_3)CF_2O)_{j''}$—$(R'_f)$—O—$(CF(CF_3)CF_2O)_{j''}$   (F) --.

COLUMN 4:

Line 24, "pefluoropolyethers" should read --perfluoropolyethers--; and
Line 37, "selctivity" should read --selectivity--; and
Line 40, "further difficult." should read --in further difficulty.--.

COLUMN 5:

Line 11, "weight 154.0" should read --weight 1540--.

COLUMN 8:

Line 59, "—$R'_f$" should read --$R_f$--.

COLUMN 9: Claim 3

Line 16, "—$(CF_2CF_2O)_C(CF_2O)_d(CF_2(CF_2)_zO)_h$—   (B)" should read
---$(CF_2CF_2O)_c(CF_2O)_d(CF_2(CF_2)_zO)_h$—   (B)"--.

UNITED STATES PATENT AND TRADEMARK OFFICE
CERTIFICATE OF CORRECTION

PATENT NO. : 7,132,574 B2
APPLICATION NO. : 10/840404
DATED : November 7, 2006
INVENTOR(S) : Rosaldo Picozzi et al.

It is certified that error appears in the above-identified patent and that said Letters Patent is hereby corrected as shown below:

COLUMN 10: Claim 3

Line 4, "—$(CR_4R_5CF_2CF_2O)_p$—$R'_R$—O—$(CR_4R_5CF_2CF_2O)$" should read ---$(CR_4R_5CF_2CF_2O)_p$—$R'_f$—O—$(CR_4R_5CF_2CF_2O)$--.

Signed and Sealed this

Tenth Day of April, 2007

JON W. DUDAS
*Director of the United States Patent and Trademark Office*